(12) United States Patent
Alpern

(10) Patent No.: US 6,651,248 B1
(45) Date of Patent: Nov. 18, 2003

(54) METHOD AND APPARATUS FOR EFFICIENT INTERFACE METHOD DISPATCH

(75) Inventor: Bowen Alpern, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 09/654,291

(22) Filed: Sep. 1, 2000

(51) Int. Cl.[7] .............................. G06F 9/44; G06F 9/00
(52) U.S. Cl. ...................... 717/162; 717/165; 709/332
(58) Field of Search .................. 717/162–167, 717/116, 148; 709/331–332, 310–330, 1, 200–253; 707/103 Y; 345/804

(56) References Cited

U.S. PATENT DOCUMENTS

| | | | | |
|---|---|---|---|---|
| 5,367,685 A | * | 11/1994 | Gosling ....................... | 717/148 |
| 5,907,707 A | * | 5/1999 | Ramalingam et al. ...... | 717/104 |
| 5,920,720 A | * | 7/1999 | Toutonghi et al. .......... | 717/148 |
| 6,381,735 B1 | * | 4/2002 | Hunt .......................... | 717/158 |
| 6,499,137 B1 | * | 12/2002 | Hunt .......................... | 717/164 |
| 6,502,237 B1 | * | 12/2002 | Yates et al. ................. | 717/136 |
| 6,519,764 B1 | * | 2/2003 | Atkinson et al. ........... | 709/332 |

OTHER PUBLICATIONS

Caven et al. An Icon–Based Approach to System Control Development. IEEE. 1990. pp. 259–264.*

Fitzgerald et al. Marmot: An Optimizing Compiler for Java. Microsoft Research. 1999. pp. 1–29.*

Krall et al. CACAO–A 64 Bit Java VM Just–in–Time Compiler. http://www.complang.tuwien.ac.at/andi/. 1999. pp. 1–10.*

Russo et al. Distributed Object Interoperability via a Network Type System. IEEE. 1992. pp. 319–327.*

* cited by examiner

Primary Examiner—Wei Zhen
(74) Attorney, Agent, or Firm—Manny W. Schecter

(57) ABSTRACT

The interface method invocation mechanism of the present invention includes an interface method table (IMT) for a given class of objects. The IMT comprises a table of entries each corresponding to a set S of interface methods that are implemented by objects of the given class. The entries of the IMT are used to support invocation of interface methods. More specifically, processing of a method invocation statement involves either I) loading the pointer to the implementation of the interface method from an entry of the IMT and passing control to this implementation; or II) loading the pointer to a conflict resolution routine pointed by an IMT entry and passing control to this conflict resolution routine. The conflict resolution routine pointed to by the IMT entry identifies at execution time to the location of the particular interface method of the two or more interface methods that are associated with the given IMT entry that corresponds to the method invocation statement being processed, and pass control to this particular interface method.

7 Claims, 10 Drawing Sheets

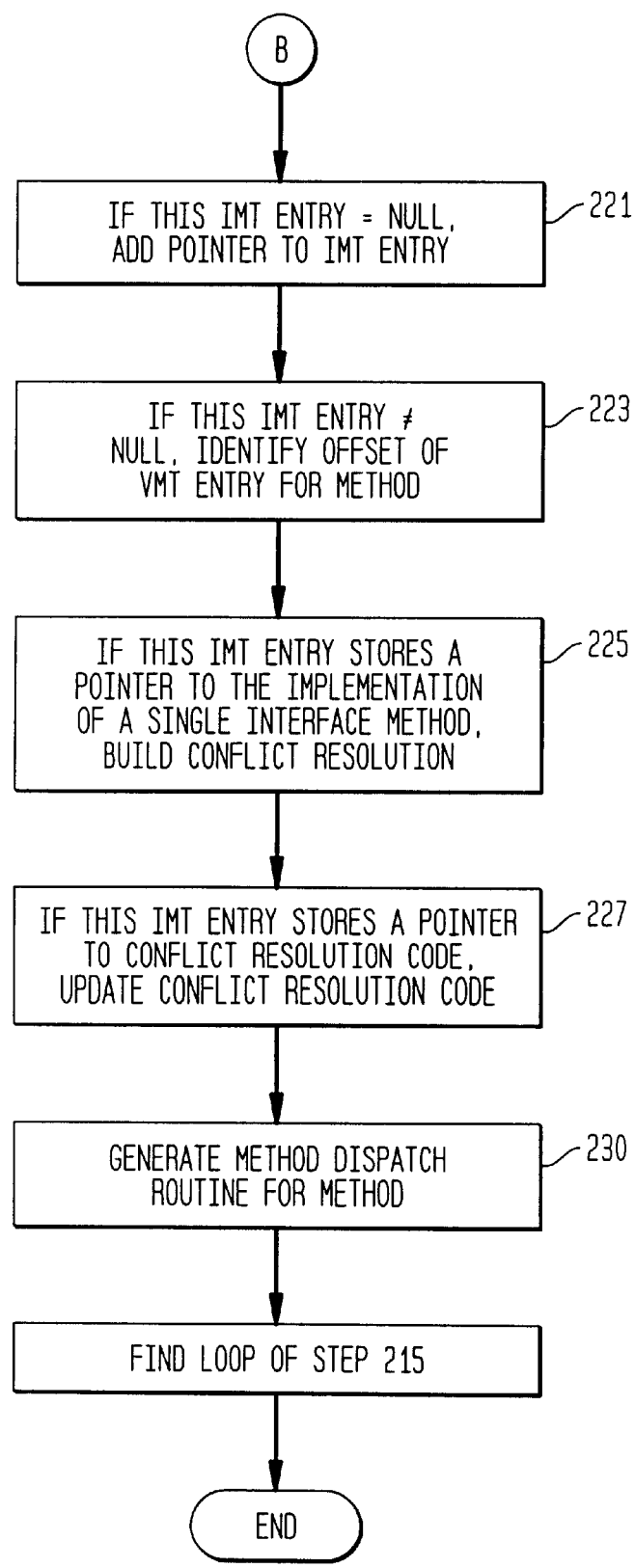
FIG. 2(iii)

METHOD AND APPARATUS FOR EFFICIENT INTERFACE METHOD DISPATCH

BACKGROUND OF THE INVENTION

1. Field of the Invention

The present invention generally relates to object oriented programming (OOP) systems and, more particularly, to OOP systems (such as the Java™ and, C++programming language) that support interfaces.

2. Background Description

An interface specifies a set of methods that must be implemented by any class of objects that declares to implement the interface, but an interface does not provide any implementation of these methods themselves. The Java™ programming model includes such a mechanism. More specifically, a Java™ interface is a public class that includes (among other things) one or more abstract method declarations that provides the method signatures for a set of methods. Any class that declares to implement a given interface (denoted "interface class") must provide an implementation of the methods specified by the given interface. In Java™, such a class must provide an implementation of the methods specified by the given interface that match the methods signatures specified by the given interface. Note that here a method signature represents the name of a method, the types of its parameters, and its return type. This differs from normal Java™ usage (which does not include the return type). In addition, a given interface may extend (directly or indirectly) another interface. The C++programming model introduced by Microsoft Corporation is another example of a model that supports interfaces.

In OO systems that support interfaces (such as Java™), a field name (or local variable name) whose type is an interface may reference the objects of any interface class that implements the interface. Moreover, the method of an interface class implemented by a given object (which we denote "interface method" for the sake of description) may be called by applying the method name (with arguments) to a field name (or local variable name) that points to the given object. Compilation (or interpretation) of such a method invocation statement typically involves generating a routine that performs dynamic dispatch to the called interface method. A more detailed description of Java™ interfaces can be found in U.S. Pat. No. 5,907,707, commonly assigned to the assignee of the present invention, herein incorporated by reference in its entirety.

Efficient implementation of dynamic dispatch of interface methods is difficult because the virtual methods of different classes that match a particular interface method signature may occur in different offsets in the virtual method tables (VMTs) for the different classes. FIG. 1 illustrates this point where the pointer to the method bar ( ) is in the second entry in the VMT for class A but is in the fourth entry of class C's VMT.(class C implements virtual methods rim and ged; as well as, foo and bar.)

The schemes to identify the correct entry in the VMT typically revolve around keeping a table (which we denote as itable for the sake of description) for each class and for each interface implemented by the class. This table is a virtual method table for the class restricted to methods for a given interface. To dispatch an interface method, the itable is located and a pointer to the target method body is obtained at a fixed offset within it. Sometimes, a dispatch time search for the itable of a required interface for a given class may be required to determine the address of the implementation of the called method. A more detailed description of such schemes can be found in Fitzgerald et al., "Marmot: An optimizing compiler for Java," Technical Report 33, Microsoft Research, Jun. 1999; Ramalingam and Srinivasan, "Object Model for Java," Technical Report 20642, IBM Research Division, Dec. 1996. The principal drawback to these schemes is that the dispatch time search is inefficient and leads to a dispatch mechanism that is computationally more expensive than virtual method dispatch.

In some Java™ implementations, this dispatch time search is optimized for under certain circumstances—when a sequence of instructions containing a method invocation is executed multiple times. In these cases, the method being invoked in the method table can be cached and this cached value can be used to reduce the overhead of the search ("The Java Virtual Machine Specification", by Tim Lindholm and Frank Yellin; "Method and Apparatus for Resolving Data References in Generated Code", U.S. Pat. No. 5,367,685 in the name of James Gosling. However, these optimization schemes cannot always completely eliminate the dispatch time search when an interface is implemented by multiple classes, and thus suffer from poor performance when invoking interface methods.

Krall and Grafl, "CACAO—a 64 bit Java VM just-in-time compiler," Concurrency: Practice and Experience, 9(11), pp. 1017–1030, 1997, describe two schemes for implementing interface method dispatch. The first scheme is a variant of the itable schemes described above. CACAO maintains an interface table with each class. There is (logically) an entry in this interface table for every interface the system has seen (as the time the class is loaded). Thus, the interface table is typically very large and consumes a large amount of storage. The entry for an interface is empty unless the class implements the interface, in which case it contains the appropriate itable. To dispatch an interface method on an object, the interface table is located, the itable for the interface is loaded at a constant offset, and a pointer to the code for the method is obtained at a constant offset into the itable. In this first scheme, an interface method dispatch is one dependent load more expensive than a virtual method dispatch. Thus, the principal drawback to this first scheme is twofold: i) the interface table typically consumes a large amount of storage, and ii) the dispatch time search is inefficient in that it requires an additional load operation than virtual method dispatch.

It appears the a substantial part of the motivation for CACAO 's second scheme is a desire to eliminate this extra dependent load operation. In this second scheme, the interface table and itable are collapsed into a single table (denoted the interface-method table) for a class. This interface-method table has (logically) an entry for every interface-method signature in the interface-method table has (logically) an entry for every interface-method signature in the system. This entry points directly at the body of the method that that implements the signature if the class has one (otherwise it is empty). For this scheme, an interface method dispatch has exactly the same cost as a virtual method dispatch. However, the drawback of this second scheme is that the interface-method table will be very big and very sparsely populated. A technique similar to graph-coloring register allocation (see Chaitin et al., "Register Allocation via coloring," Computer Languages 6, pgs. 47–57, January 1981) can be used to reduce the size of these tables substantially. More specifically, if two interface method signatures are never implemented by the same class, then they can be assigned the same slot in the interface method tables. However, the drawback to this interface-method coloring scheme is that it requires knowledge of all the interfaces the system will ever see in order to do the coloring. Thus, it is not appropriate in a context, such as the Java programming model, that requires dynamic class loading.

Therefore, there remains a need in the art to provide an efficient mechanism for interface method dispatch that reduces the space and computational overhead associated with the dispatch time processing.

SUMMARY OF THE INVENTION

The above-stated problems and related problems of the prior art are solved with the principles of the present invention, method and apparatus for efficient interface method dispatch, which includes an interface method table (IMT) for a given class of objects. The IMT comprises a table of entries each corresponding to a set S of interface methods that are implemented by objects of the given class. An IMT entry preferably stores data representing the following:

in the event that the set S is empty, the IMT entry stores a null/empty value;

in the event that the set S includes only a single interface method, the IMT entry stores a pointer to the implementation of the single interface method in the set S; and in the event that the set S includes two or more interface methods, the IMT entry stores a pointer to a conflict resolution routine.

The entries of the IMT are used to support invocation of interface methods. More specifically, processing of a method invocation statement involves either i) loading the pointer to the implementation of the interface method from an entry of the IMT and passing control to this implementation; or ii) loading the pointer to a conflict resolution routine pointed to by an IMT entry and passing control to this conflict resolution routine. The conflict resolution routine pointed to by the IMT entry identifies (at execution time) the location of the particular interface method (of the two or more interface methods that are associated with the given IMT entry) that corresponds to the method invocation statement being processed, and passes control to this particular interface method. Thus, the interface method invocation mechanism of the present invention advantageously replaces the intensive search performed by prior art techniques with efficient processing that, in the case that the corresponding IMT entry is associated with a single interface method, is equivalent to a virtual method call, or, in the case that the corresponding IMT entry is associated with multiple interface methods, involves lightweight and more efficient conflict resolution code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 6:
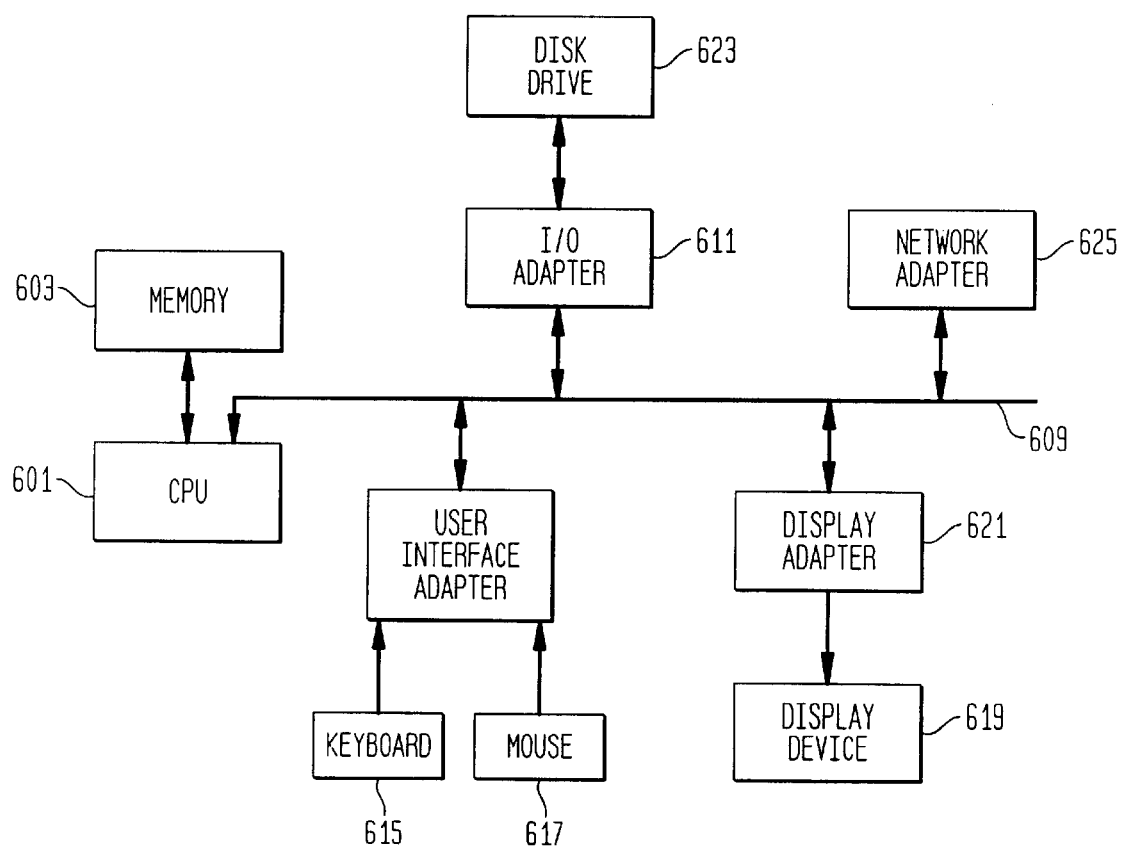
FIG. 6 is a block diagram illustrating a computer processing apparatus on which the subject invention may be implemented.

Referring now to the drawings, and more particularly to FIG. 6, there is shown a representative computer processing apparatus on which the subject invention may be implemented. The computer processing apparatus includes a central processing unit (CPU) 601 and memory system 603. The memory system 603 typically includes one or more cache memory subsystems and main memory, which is typically implemented using dynamic random-access memory modules. One or more of the cache memory subsystems may be partitioned into an instruction cache and data cache. The instruction cache stores instructions to be executed by the CPU 601. The data cache stores data to be used in the execution of such instructions. The CPU 601 includes one ore more execution units. The execution units may include a branch processor, one or more integer units (FXU), and one or more floating point units (FPU) (not shown). The branch processor executes branch instructions fetched from the memory system 603. The FXU executes integer based instructions fetched from the memory system 603. And the FPU executes floating point instructions fetched from the memory system 603. The computer processing apparatus may also include additional execution units (not shown), for example a multimedia execution unit, for executing varying sets of instructions issued from the instruction cache. The execution unit(s) of the CPU 601 access a register file in processing instructions. The register file typically includes a set of general purpose registers, a set of floating point registers, and a set of condition registers.

The CPU 601 interfaces to one or more system buses 609 (one shown) to which are attached an input/output (I/O) adapter 611 and a user interface adapter 613. Typically, the user interface adapter 613 has attached to it a keyboard 615, a mouse 617, and/or other user interface devices such as a touch screen device (not shown). Such touch screen device would optionally be installed on the display 619, here represented as a cathode ray tube (CRT) display but which may be a liquid crystal display (LCD) or other suitable display device. The display 619 is connected to the system bus 609 via a display adapter 621.

The computer system's operating system (and other utilities), application program code and data are stored in persistent memory and temporarily loaded into the memory system 603 for execution by the CPU 601. The persistent memory is typically provided by a disk drive 623 that is coupled to the CPU 601 via system bus 609 and I/O adapter 611. In addition, persistent memory may be provided by network resources coupled to the CPU 601 via the system bus 609 and a network adapter 625. In this case, portions of the computer system's operating system (or other utilities), portions of the application program code and data may be retrieved from network resources and loaded into the memory system 603 for execution by the CPU 601.

Figure 7A:
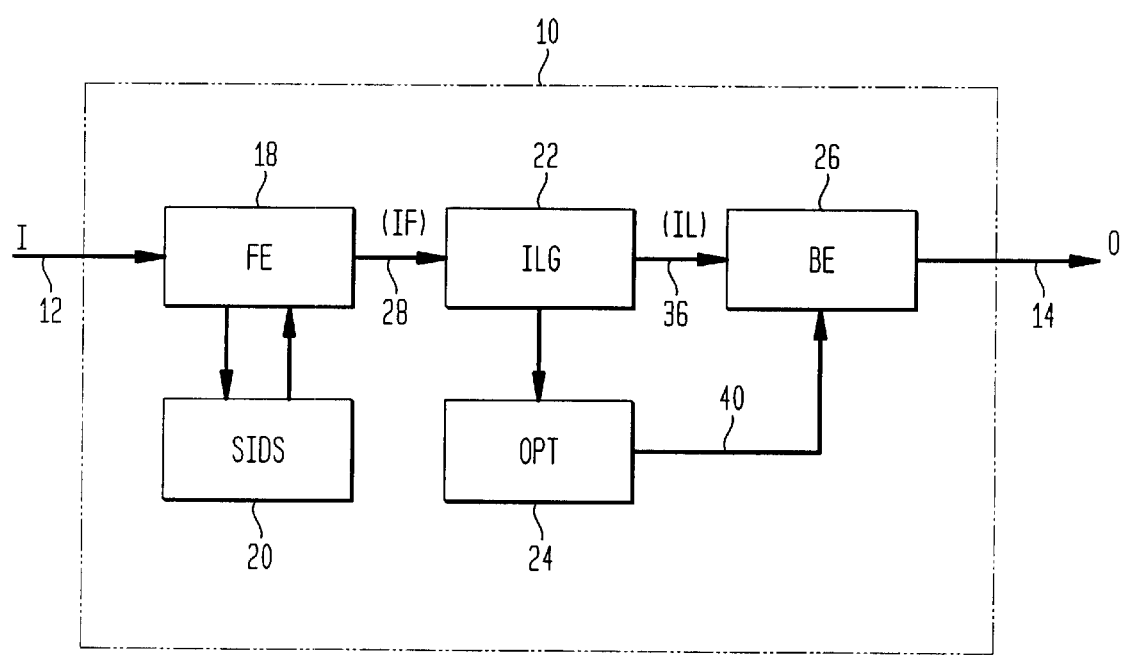
FIG. 7(A) is a block diagram of a compiler apparatus of the present invention.

It should be noted that the mechanism of the present invention may be utilized in the generation and execution of a compiled program. A compiled program is generated by a compiler that compiles a source program thereby generating executable code for a specific computer architecture. As shown in FIG. 7(A), a compiler 10 accepts as an input (I) 12 a high-level language program, and operates on it to an end of generating an output (O) 14 comprising an output target language program 16. The output target language program is typically executable on a specific computer architecture. The compiler 10 typically includes a front end (FE) 18, a symbol table 20 for recording information about symbols in an input program, an intermediate language generator (ILG) 22, an optimizer (OPT) 24, and a back end (BE) 26.

The front end 18 typically converts the input program 12 to a (possibly) different internal form (IF) that may be conveyed to the intermediate language generator 22. As part of the preparation of the internal form, the front end 18 typically parses and performs semantic analysis on the source code. The front end may save information in, and possibly retrieve information from, the symbol information data structure(s) 20. These symbol information data structures, if they are used, may either be separate from or adjoined to the intermediate form.

The intermediate language generator 22 produces intermediate language instructions (IL) from the internal form of the program, possibly consulting the symbol table 20. The intermediate language form of the program may be conveyed to the back end 26 either directly or by way of the optimizer 24. If the intermediate language (IL) form of the program is conveyed to the optimizer 24, then the optimizer produces a functionally equivalent and preferably faster or smaller version of the program, typically again in the intermediate form. This version of the program may then be conveyed to the back end 26. To this end, the optimizer 24 may be in communication with the symbol table 20. Once an intermediate language form of the program is received by the back end 26, either directly or after optimization, the back end 26 generates executable code for a specific computer architecture that is functionally equivalent to the intermediate language form of the program. In addition, for object oriented programming languages, the back end 26 implements an object model and generates code that implements the object oriented features used by the source program. In addition, the back end 26 may optimize the generated code. The constitutions and functions of these elements are well known in will not be otherwise described here. For example, further description on the various intermediate language generators and other functionality of the compiler may be found in A.V. Aho et al., "Compilers Principles, Techniques and Tools, Addison-Wesley, 1986.

It should also be noted that the mechanism of the present invention may be utilized in the generation and execution of a compiled-interpreted program. A compiled-interpreted program is generated and executed by a hybrid compiler-interpreter similar to the apparatus shown in FIG. 7(A); however, the compilation step is performed at compile time and the interpretation step is performed at execution time. In this case, the compiler compiles the source program thereby generating code in intermediate form (IL). At execution time, the interpreter may execute the intermediate code (IL) or translate the IL into a sequence of instructions for execution on a specific computer architecture. The compiler operates similarly to the compiler described above for compiled programs. The interpreter may include a main interpretation routine and a number of operation specific routines. The main interpretation routine receives the intermediate code generated by the compiler as an input, interprets the code, and invokes the appropriate operation specific routine based upon the interpretation. Preferably, one of the operation specific routines of the interpreter handles method invocations. The constitutions of these elements and functions are well known and will not otherwise be described here.

Figure 7B:
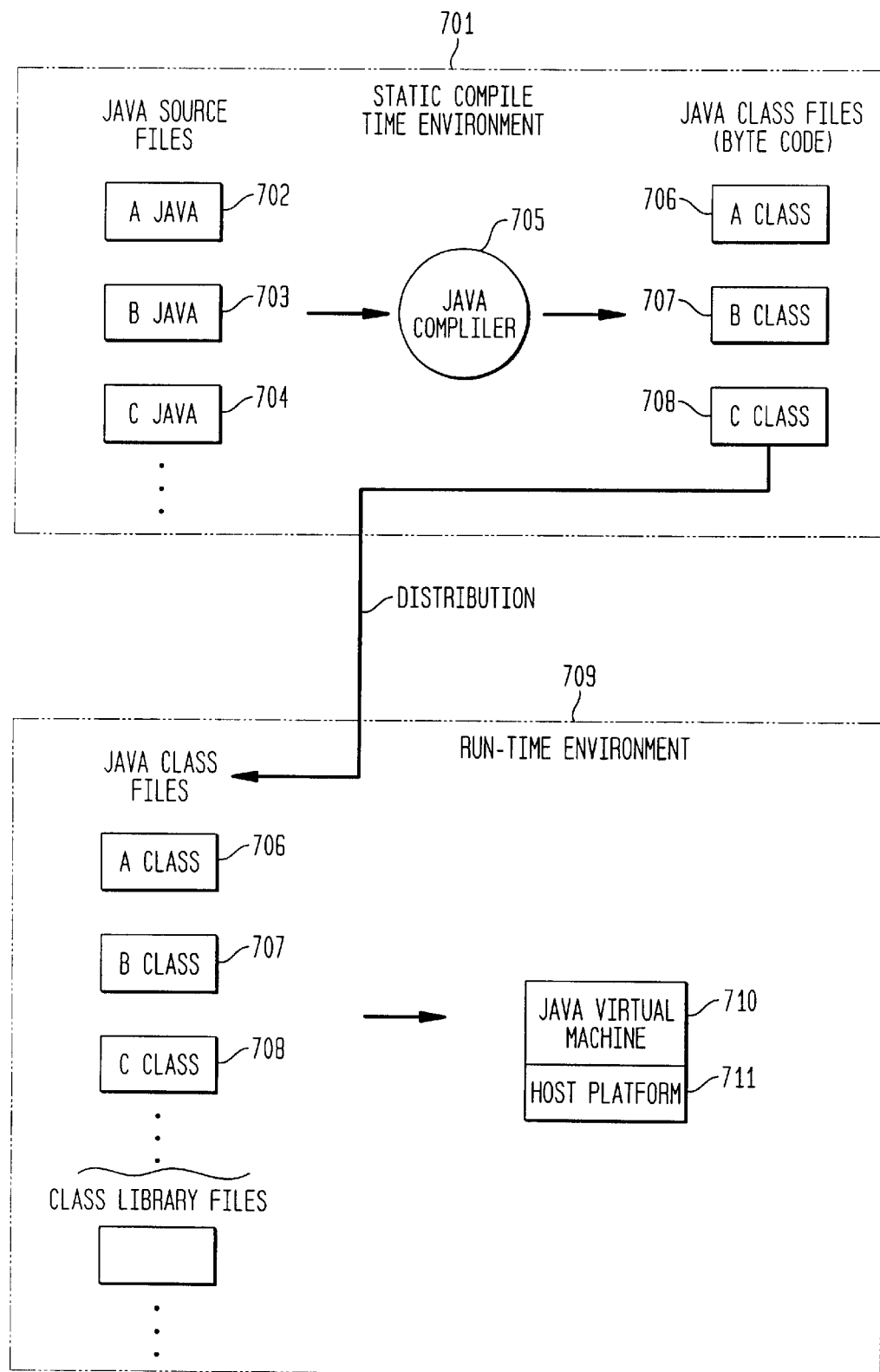
FIGS. 7(B) and (C) are pictorial illustrations of an apparatus for compiling and executing Java™ programs.

The Java™ programming model embodies this hybrid compiler/interpreter approach. The Java™ programming model is illustrated in FIGS. 7(B) and (C). More specifically, in a static compile-time environment 701, Java™ source files 702,703,704 written in the Java™ programming language are compiled by a Java™ compiler 705 into Java™ class files 706, 707, 708 (which contain sequences of bytecodes suitable for execution on a Java™ Virtual Machine (Jvm)710, as defined by Lindholm and Yellin, "The Java™ Virtual Machine Specification," Addison-Wesley, 1997, herein incorporated by reference in its entirety). The Java™ class files may then be distributed to customers (for example, over a network link or via CD-ROM) where they are processed by a run-time environment. In this run-time environment 709, the Java™ class files 706,707,708 and typically a library of class files (in bytecode form) are processed by the Jvm 710 that operates in conjunction with a host platform 711 to dynamically load the class files, translate the bytecode sequences of the class files into a form suitable for execution on the host platform 711, and execute the translated form of bytecode sequences on the host platform 711.

Figure 1:
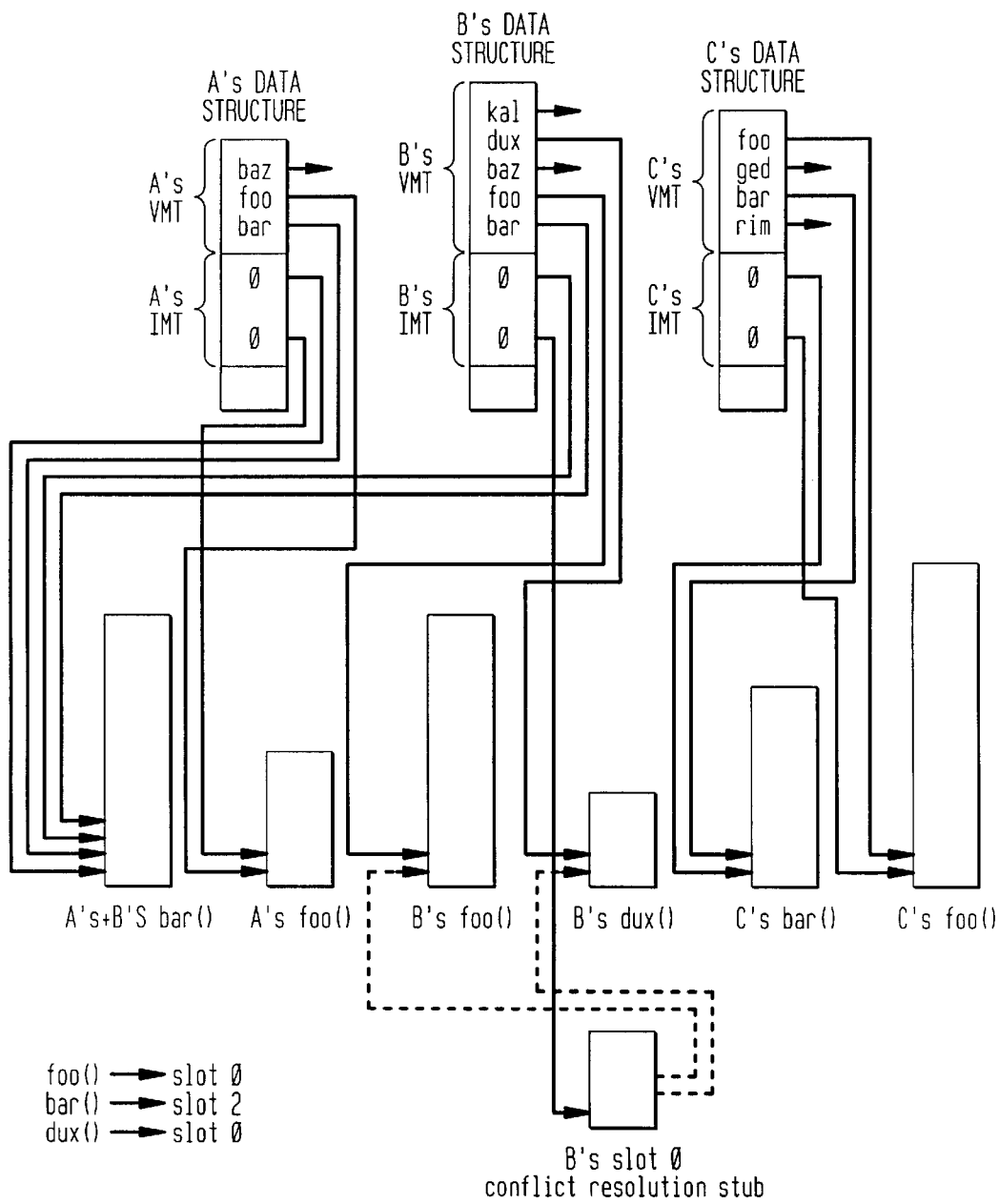
FIG. 1 is a model of Java™ classes and associated objects that provide implementations of interface methods according to the present invention.
Figure 7C:
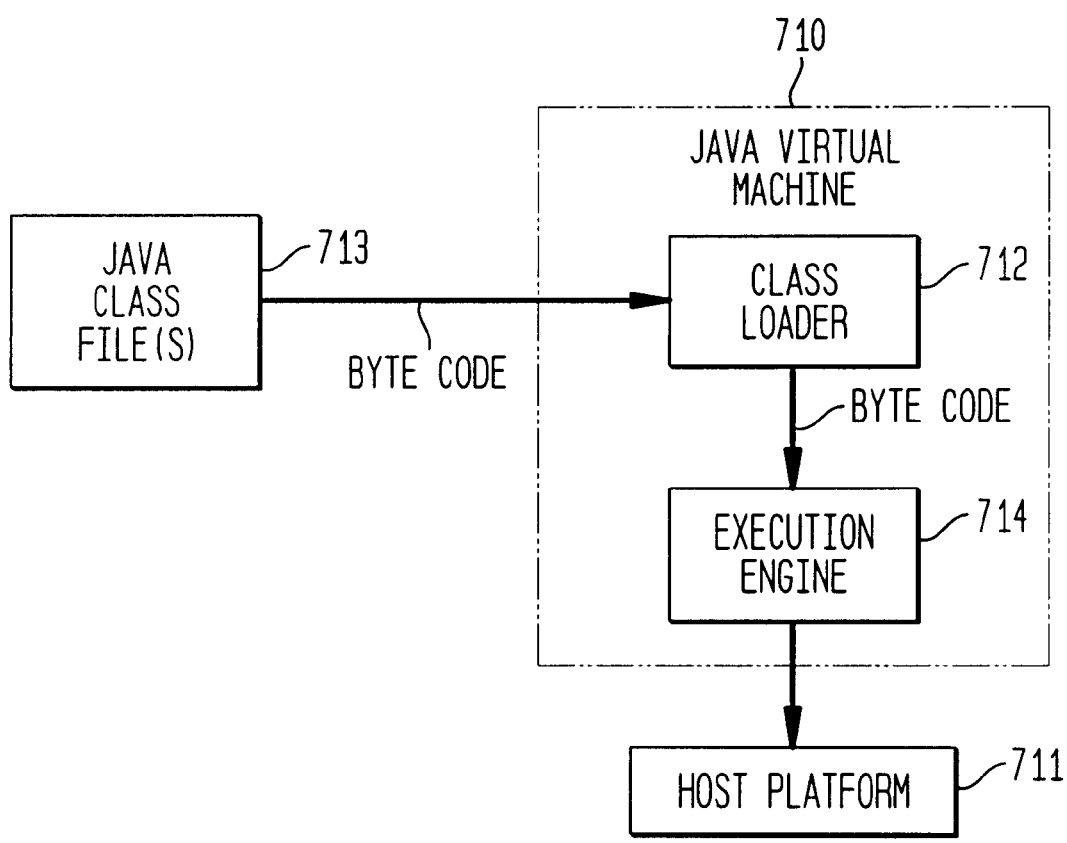

FIG. 7(C) provides a pictorial illustration of an exemplary Jvm 710. It includes a class loader 712 that dynamically loads Java class files 713 (in byte code form) and an Execution Engine 714 that performs a dynamic linking process that incorporates the class file into the run-time state of the Jvm 710. The dynamic loading and linking process creates and lays out Java objects according to a predetermined object model. Typically, this object model supports dynamic linking through a virtual method dispatch mechanism that includes a virtual method table (VMT) for a given class of objects. The VMT for a given class comprises a table of entries each containing a pointer to an implementation of a virtual method implemented by objects of the given class. Thus, the VMT contains entries for all virtual methods implemented by objects of the given class. For example, FIG. 1 illustrates the VMT for a class A whose objects implement the virtual methods foo( ) and bar( ) of interface I in addition to the virtual method baz( ). In addition, the VMT for a given class may include entries containing pointers to an implementation of virtual methods implemented by objects of any superclass (parent, grandparent, etc.) of the given class. In this case, the VMT contains entries for all virtual methods implemented by objects of the superclass of the given class. For example, FIG. 1 illustrates the VMT for a class B [that extends (is a child or subclass of) class A and implements interface J] that includes entries for the virtual methods foo( ) and bar( ) implemented by the superclass of class B. In such a system, a virtual method dispatch entails accessing the VMT for the class, locating (at a fixed offset) the pointer of the implementation of the appropriate virtual method, and using this pointer to branch and link to the address of the implementation of the appropriate virtual method. A more detailed description of the operations performed by the class loader may be found in Venners, "Inside the Java Virtual Machine," McGraw-Hill, 1998, Ch. 7–8, pp. 171–262, herein incorporated by reference in its entirety. An execution engine operates cooperatively with the class loader to translate the bytecode sequences of the class files into a form suitable for execution on the host platform, and execute the translated form of bytecode sequences on the host platform. The execution engine typically includes a run-time subsystem that supports exceptions, input/output, reflection, threads and synchronization, and memory management. In addition, the execution engine includes a translation subsystem that translates the bytecode sequences of the class files into a form suitable for execution on the host platform. The translation subsystem may perform a byte-code interpretation operation that maps one (or a small number) of bytecodes to a form suitable for execution on the host platform. In the alternative, the translation subsystem may compile and optimize a larger block of bytecode (for example, an entire method or class file) to a form suitable for execution on the host platform. A more detailed description of the processing performed by these components may be found in Alpern et al. "The Jalapeno virtual machine", IBM Systems Journal, Vol. 39, No. 1, 2000, pgs. 211–238 and Suganuma et al., "Overview of the IBM Java Just-in-Time Compiler," Vol. 39, No. 1, 2000, pgs. 175–193, herein incorporated by reference in their entirety.

According to the present invention, a mechanism is provided for efficient dynamic method invocations in object oriented programming environments (such as Java™) that support abstract interface declarations and classes that implement such interfaces. In addition, the mechanism is suitable for use in object oriented programming environments (such as Java™) that support multiple inheritance. More specifically, the mechanism of the present invention includes a data structure for a given class of objects that comprises two tables: an interface method table (IMT) and a virtual method table (VMT) for the given class of objects. As described above, the VMT for a given class comprises a table of entries each containing a pointer to an implementation of a virtual method implemented by objects of the given class. Thus, the VMT contains entries for all virtual methods implemented by objects of the given class. In addition, the VMT for a given class may include entries containing pointers to an implementation of virtual methods implemented by objects of any superclass (parent, grandparent, etc.) of the given class. Thus, the VMT includes an entry for all interface methods implemented by the objects of the given class (and implemented by the objects of any superclass of the given class). The IMT for a given class is a table of entries each corresponding to a set S of interface methods that are implemented by objects of the given class. In the preferred embodiment of the present invention, an IMT entry stores data representing the following:

in the event that the set S is empty, the IMT entry stores a null/empty value;

in the event that the set S includes only a single interface method, the IMT entry stores a pointer to the implementation of the single interface method in the set S; and in the event that the set S includes two or more interface methods, the IMT entry stores a pointer to a conflict resolution routine.

The entries of the IMT are used to support invocation of interface methods. More specifically, when processing a method invocation statement (preferably, during dynamic execution of a method invocation statement such as the invokeinterface Jvm bytecode) that invokes an interface method that corresponds to an IMT entry, a method invocation routine performs the following operations: an ID value assigned to the signature of the interface method to be invoked is stored in a predetermined storage location; a pointer to the IMT entry corresponding to the method to be invoked is generated; and a branch and link operation to address of the method pointed to by the pointer stored in the identified IMT entry is performed. Note that in certain instances the identified IMT entry may store a pointer to a conflict resolution routine. In such instances, the branch and link operation performed as part of the method invocation routine transfer control to the conflict resolution routine pointed to by the identified IMT entry.

Note that any given IMT entry that stores a pointer to a conflict resolution routine corresponds to two or more interface methods. The conflict resolution routine pointed to by a given IMT array entry is used to identify (at execution time) the location of the particular interface method (of the two or more interface methods that are associated with the given IMT array entry) that corresponds to the method invocation statement being processed. Preferably, the conflict resolution routine pointed to by a given IMT array entry performs the following operations: for each virtual method $VM_i$ in the set $S_j$ of two or more interface methods that correspond to the given IMT entry, an association between an ID value assigned to the signature of the method $VM_i$ and a VMT offset value identifying the VMT entry that points to the implementation of the method $VM_i$ is provided; a predetermined storage location (in which the ID value assigned to the signature of the method to be invoked had been stored earlier in the method invocation routine) is read; and a search is performed to determine if the ID value read from the predetermine storage location matches the ID value for one of the methods in the set $S_j$. If a match is found, the VMT offset value associated with the matching ID value is used to generate a pointer to a VMT entry for the appropriate virtual method. The address of the implementation of the appropriate method is then calculated based upon the data stored in the identified VMT entry. Finally, the conflict resolution routine ends by transferring control (preferably using a non-linking branch instruction) to the calculated address of implementation of the appropriate method.

Figure 2I:
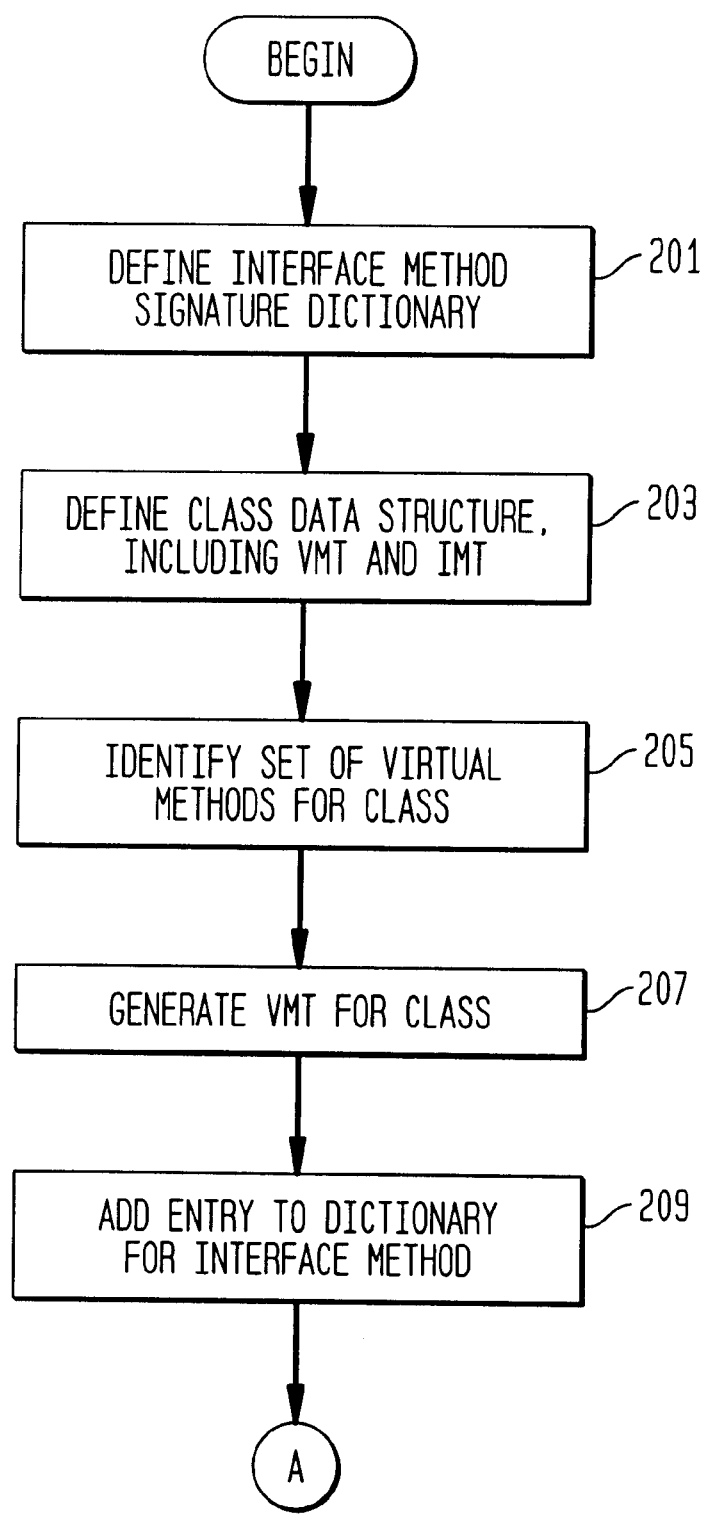
FIGS. 2(i)–(ii) is a flow chart illustrating the compile time processing according to the present invention.
Figure 2:
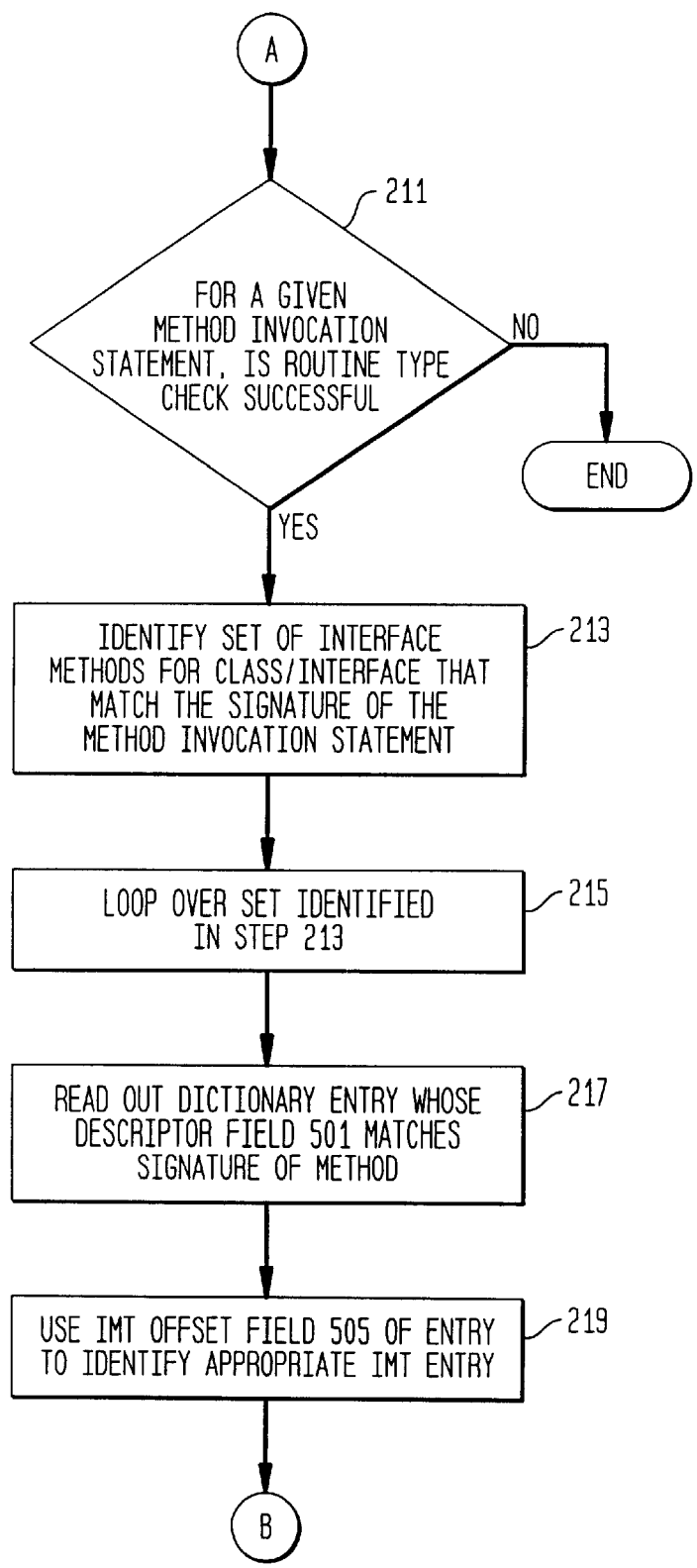

A detailed description of the processing of an object oriented program according to a preferred embodiment of the present invention is now set forth with reference to FIG. 2. This processing (which is preferably part of the run-time environment that processes the object oriented program) constructs the IMT and VMT for a given class of objects, and generates the method invocation routines and conflict resolution routines for interface method dispatch.

Figure 5:
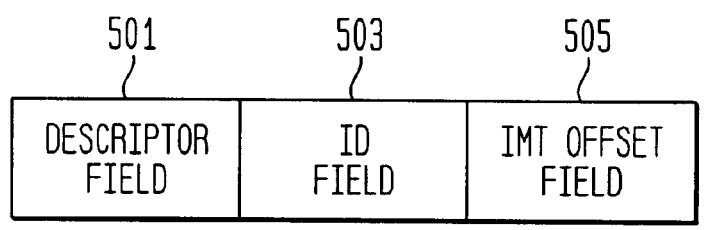
FIG. 5 is a pictorial illustration of an exemplary Interface Method Signature Dictionary entry according to the present invention.

In step 201, an interface method signature dictionary (hereinafter "dictionary") is defined that will store a plurality of entries each corresponding to a particular interface method signature of the interface methods declared and implemented by the objects of the program. As illustrated in FIG. 5, each entry of the dictionary includes a descriptor field 501, an identifier field 503, and an IMT offset field 505. The descriptor field 501 stores data that characterizes a particular interface method signature. Preferably, the descriptor field 501 stores an encoding that represents the name, argument type and return type of the particular interface method signature of the entry. Note that in the preferred embodiment of the present invention, the data stored in the descriptor field 501 may not be unique to each interface method implemented by the objects of the program. For example, interface methods belonging to different classes can have the same method signature encodings stored in their corresponding descriptor fields. The identifier field 503 stores an ID value assigned to the interface method signature stored in the descriptor field 501 of the entry. Preferably, the ID value assigned to a given interface method signature is unique with respect to the given interface method signature (i.e., it distinguishes the given method signature from other interface method signatures). Finally, the IMT offset field 505 stores data that identifies the IMT entry corresponding to the interface method signature characterized by the data field 501 of the entry in the IMT for any class of objects that implements an interface method whose signature matches the method signature characterized by the descriptor field 501 of the entry.

In step 203, for a given class of objects, a data structure is defined that will include the IMT and VMT for the class. As described above, the VMT for the given class comprises a table of entries each containing a pointer to a virtual method implemented by the class. The IMT for a given class is a table of entries each corresponding to a set S of interface methods. An IMT entry stores data representing the following:

in the event that the set S is empty, the IMT entry stores a null/empty value;

in the event that the set S includes only a single interface method, the IMT entry stores a pointer to the implementation of the single interface method in the set S; and in the event that the set S includes two or more interface methods, the IMT entry stores a pointer to a conflict resolution routine.

Preferably, the IMT for a given class of objects is implemented as a fixed-size array.

In step 205, for a given class of objects, a set of virtual methods is identified. In step 207, an implementation of each virtual method in the set identified in step 205 is generated, and the address space for storing these implementations is allocated, and a VMT entry that points to the address space allocated to these implementations is added to the VMT for the given class of objects.

In step 209, upon encountering an interface method invocation statement (such as the invokeinterface Jvm bytecode) in the program, an entry in the interface method signature dictionary is added that corresponds to the signature of the interface method defined by this method invocation statement, if such an entry does not already exist in the dictionary. More specifically, an interface method invocation statement (such as the invokeinterface Jvm bytecode) refers to an object and a particular interface method signature. As described above, this entry includes: a descriptor field 501 that characterizes the signature defined by this method invocation statement; an identifier field 503 that stores an ID value assigned to the interface method signature stored in the descriptor field 501 of the entry; and an IMT offset field 505 that identifies the IMT entry corresponding to the interface method signature characterized by the data field 501 of the entry in the IMT for the type (class) defined by this method invocation statement. Preferably, step 209 is performed only for the first time that a given interface method invocation statement is encountered during the processing of the program.

In step 211, when executing an interface method invocation statement in the program, a run-time test is made that checks that the type (class) of the object referred to by the method invocation statement does in fact implement an interface method whose signature matches the method signature referred to by the interface method invocation statement. A more detailed illustration of such steps can be found in Lindholm and Yellin, "The Java™ Virtual Machine Specification," Addison-Wesley, 1997, pgs. 258–260, incorporated by reference above. If this run-time test is successful, operation continues to steps 213–230 to continue processing related to this interface method invocation statement; otherwise an exception is thrown and the processing ends.

In step 213, a set of interface methods are identified that pertain to the type (class) of the object referred to by this method invocation statement and pertain, more particularly, to the interface that includes a method that matches the method signature referred to by this method invocation statement. Preferably, this step is accomplished when executing this interface method statement for the first time in the program.

In step 215, a loop is performed over the set of interface methods identified in step 213 wherein the operations of steps 217–230 are performed for each given interface method in the set.

In step 217, the method signature dictionary is accessed, and the entry whose descriptor field 501 matches the method signature of the given interface method is read out from the dictionary.

In step 219, the IMT offset field 505 of the matching entry read out from the dictionary in step 217 is used to identify the IMT entry for the given interface method in the IMT for the type (class) of the object referred to by the particular method invocation statement.

In step 221, if the IMT entry identified in step 219 stores a null/empty value, the pointer to the implementation of the given interface method is added to this IMT entry, and the operation continues to step 230; otherwise, the operation continues to step 223.

In step 223, if the IMT entry identified in step 219 does not store a null/empty value (stores a pointer to the implementation of a single interface method or to a conflict resolution routine), in the VMT for the type (class) of the object referred to by the particular method invocation statement of the entry, the offset of the VMT entry that stores a pointer to the given interface method is identified, and operation continues to step 225.

In step 225, if the IMT entry identified in step 219 stores a pointer to the implementation of a single interface method, a conflict resolution routine that resolves between the single interface method and the given interface method, the IMT entry identified in step 219 is updated to store a pointer to this conflict resolution routine, and the operation continues to step 230; otherwise the operation continues to step 227. The conflict resolution routine is preferably generated as follows. In the VMT for the type (class) of the object referred to by the particular method invocation statement, the offset of the VMT entry that stores a pointer to this single interface method is identified. The identifier field 503 of the matching entry read out from the dictionary in step 217 is used to identify the ID value assigned to the given interface method. In addition, the ID value assigned to the single interface method is identified. Finally, the ID value and VMT offset for both the single interface method and the given interface method are used to generate a conflict resolution routine that resolves between the single interface method and the given interface method. A more detailed description of the conflict resolution routine is described below.

In step 227, if the IMT entry identified in step 219 stores a pointer to the implementation of a conflict resolution routine, this conflict resolution routine is updated to resolve between all of the interface methods in the set S of two or more interface methods corresponding to the IMT entry (including the given interface method), and the operation continues to step 230. The conflict resolution routine is preferably updated as follows. The identifier field 503 of the matching entry read out from the dictionary in step 217 is used to identify the ID value assigned to the given interface method. And the ID value and VMT offset (identified in step 223) for the given interface method is used to update the conflict resolution routine to resolve between all of the interface methods in the set S of two or more interface methods corresponding to the IMT entry (including the given interface method). A more detailed description of the conflict resolution routine is described below.

Finally, in step 230, a method dispatch routine for the given interface method is generated and integrated into the executable program. A more detailed description of an exemplary method dispatch routine is set forth below with respect to FIG. 4.

Conflict Resolution Routine

Figure 3:
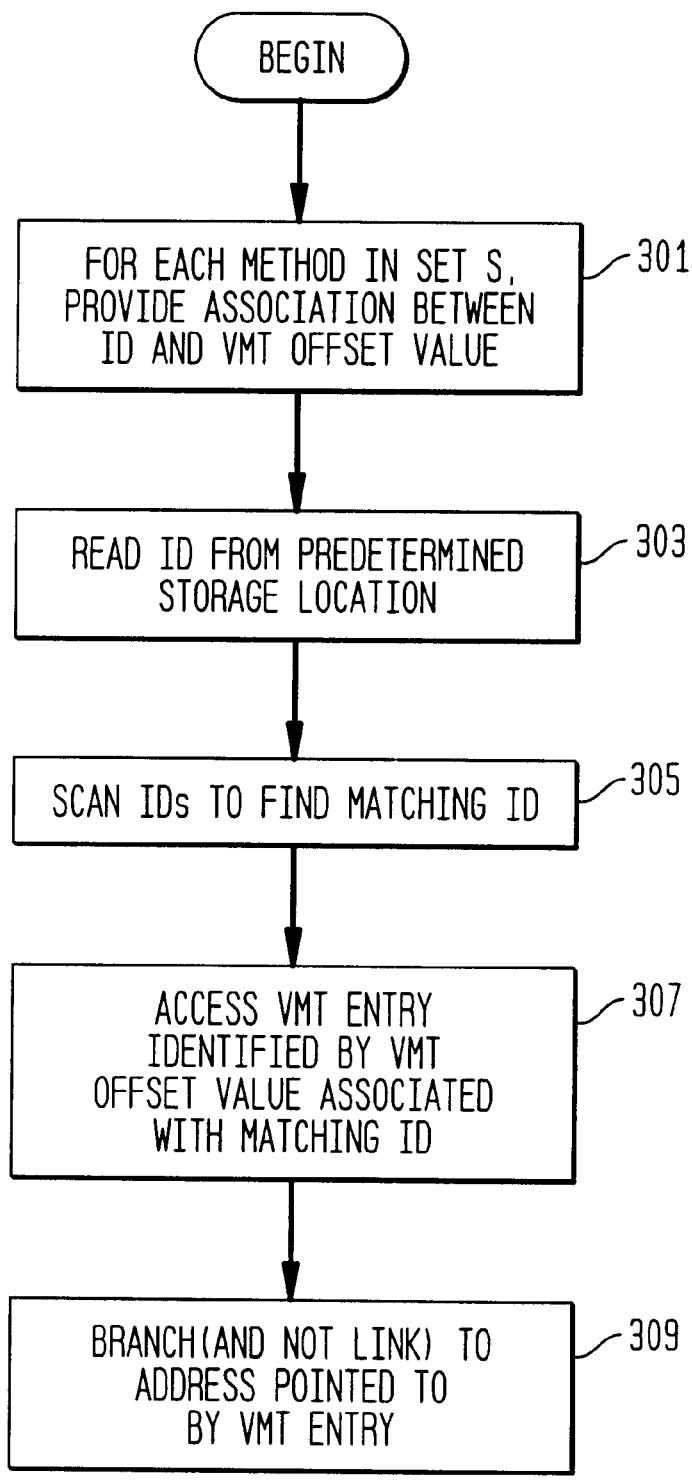
FIG. 3 is a flow chart illustrating the operations performed by a conflict resolution routine according to the present invention.

As described above, the conflict resolution routine pointed to by a given IMT array entry is used to identify (at execution time) the location of the particular interface method (of the two or more interface methods that are associated with the given IMT array entry) that corresponds to the method invocation statement being processed. The conflict resolution routine associates the ID value assigned to the signatures of the interface methods that share the same IMT array index with pointers that identify the location of the implementation of such interface methods. These pointers may be direct pointers to the implementations of such interface methods. However, when used in systems wherein the location of the interface methods may change dynamically (such as in systems that employ garbage collection as in Java), this approach has drawbacks: the direct pointers in the conflict resolution routine will need to be updated whenever the implementation of the corresponding interface method is moved. Thus, in such systems, it is preferable to use indirect pointers to identify the location of the implementation of such interface methods. In the preferred embodiment, as described below in more detail, the indirect pointers of the conflict resolution routine point to VMT entries that provide the location of the appropriate interface method. In this preferred embodiment, the VMTs are updated accordingly when location of at least an interface method implemented by the objects of the class is changed dynamically. A detailed description of the operations performed in an exemplary conflict resolution routine according to the present invention is now set forth with reference to FIG. 3.

In step 301, for each given method in a set of methods that includes at least those methods that share the same IMT array index, an association between the ID value assigned to the signature of the given interface method and a VMT offset value identifying the VMT entry that points to the implementation of the corresponding interface method is provided. These associations may be implemented in a table (or, in the alternative, in a sequence of code statements). This association is preferably implemented by storing a VMT offset value (that identifies the VMT entry that points to the implementation of the corresponding interface method, and accessing the corresponding VMT entry by: using the this parameter of the given interface method being invoked to locate the class object for the method being invoked, and then using the VMT offset value into this class object to locate the corresponding VMT entry that points to the implementation of the corresponding interface method.

In step 303, the ID value assigned to the signature of the interface method to be invoked is read from a predetermined storage location. In the preferred embodiment of the present invention, the general purpose registers of the register file of the CPU 601 that is executing the processes described herein can be partitioned into four types:

- Type 1: Dedicated Registers—registers reserved for predetermined contents; access to these registers may be selectively controlled;
- Type 2: Volatile (Caller Save) Registers—registers that can be used to temporarily store data; the contents is such registers are not preserved across calls; volatile registers are different from scratch registers in that they can be used to pass method parameters.
- Type 3: Nonvolatile (Callee Save) Registers—registers that can be used to temporarily store data; the contents is such registers are preserved across calls; however, they must be saved (typically to a stack) on method entry and restored on method exit.
- Type 4: Scratch Registers—registers that can be used to temporarily store data; the contents is such registers are not preserved across calls; scratch registers are different from volatile registers in that they cannot be used to pass method parameters. Scratch registers can be accessed by the compilation routine between method calls.

In such a system, the ID value assigned to the virtual method to be invoked is stored into (during the method dispatch routine discussed below) and read from one of the scratch registers. Note that using such a scratch register minimizes the computational overhead in storing and reading this ID value (as opposed to using the memory system 603 to store the ID value), which improves the efficiency of the virtual method dispatch mechanism of the present invention.

In step 305, a scan is performed over the ID values provided in step 301 to find the one ID value (in the set of ID values provided in step 301) that matches the ID value read from the predetermined storage location in step 303. The scan operation may involve a linear search, or a binary search. The scan may also be optimized by caching of the result of previous scans as described in Lindholm and Yellin, "The Java Virtual Machine Specification," Addison-Wesley, 1997, and in "Method and Apparatus for Resolving Data References in Generated Code", U.S. Pat. No. 5,367,685 in the name of James Gosling, herein incorporated by reference in its entirety.

In step 307, the VMT entry identified by the VMT offset value associated with the matching ID value determined in step 305 is accessed. In this step, the VMT for the object on which the interface method is being invoked is preferably obtained as the "this" parameter of the interface method.

Finally, in step 309, a branch operation is performed to the address of the implementation of interface method pointed to by this VMT entry (the VMT entry accessed in step 307), thereby completing the invocation of the interface method. In the preferred embodiment of the present invention, the link state required to begin processing of the interface method is provided by a branch and link operation of the method dispatch routine (as described below) that passed control to this conflict resolution routine of FIG. 3.

Method Dispatch Routine

Figure 4:
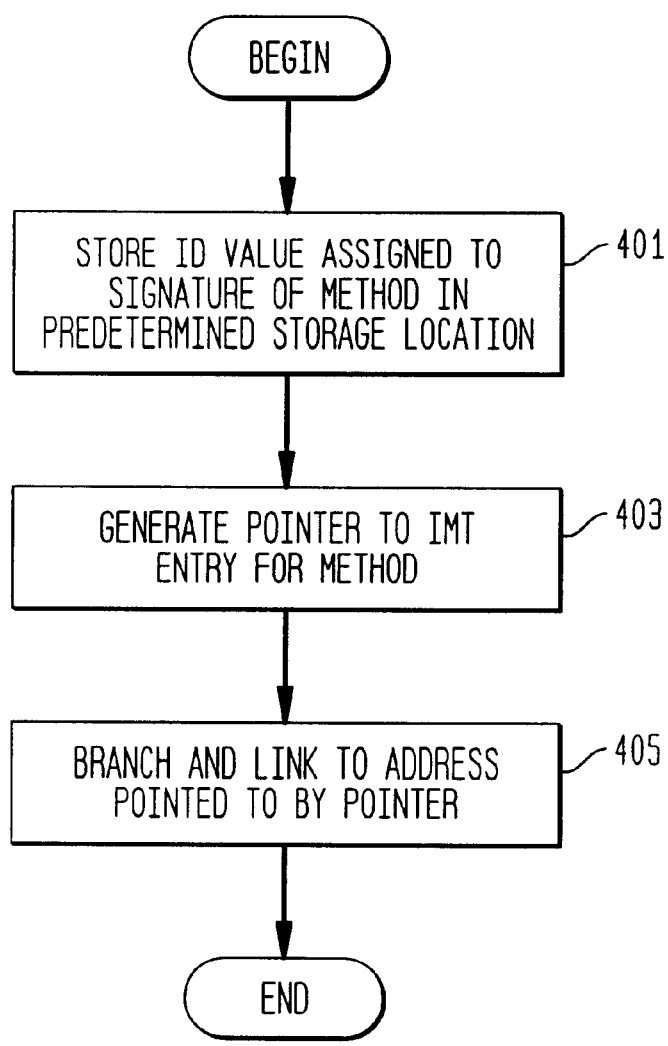
FIG. 4 is a flow chart illustrating the operations performed by an interface method invocation routine according to the present invention.

A detailed description of the operations performed in an exemplary method dispatch routine according to the present invention is now set forth with reference to FIG. 4. In step 401, the ID value assigned to the signature of the interface method to be invoked is stored in a predetermined storage location. In the preferred embodiment of the present invention, the ID value assigned to the signature of the interface method to be invoked is stored into one of the scratch registers of the CPU 601 that is executing the processes described herein. In step 403, a pointer to the IMT entry corresponding to the interface method to be invoked in generated. This may involve adjusting the pointer identified by the this parameter of the interface method being invoked by an offset that points to the appropriate IMT entry. Finally, in step 405, a branch and link operation is performed to the address of the method pointed to by the pointer stored in the corresponding IMT entry (the IMT entry pointed to by the pointer generated in step 403). The branch and link operation is used to store the link state required to begin processing of the interface method and restore the state as appropriate after returning from the invoked interface method.

FIG. 1 illustrates an example of an object model of Java classes and associated objects that provide implementations of interface methods according to the present invention. More specifically, consider class B that is a subclass of class A and implements interface J. Note that class A implements interface I. The class data structure for class B includes a VMT that includes the following:

i) pointers to virtual methods of class B—kal( ) and baz( );

ii) pointer to the method of interface J—dux( );

iii) pointer to the methods of interface I—foo( ) and bar( ).

In addition, the B class data structure includes an IMT for the class as follows:

i) slot 2 corresponds to a single interface method—A and B's bar( ); it stores a pointer to the implementation of this single interface method; and ii) slot 0 corresponds to two interface methods—B's dux( ) and B's foo( ); it stores a pointer to a conflict resolution routine that is used to identify (at execution time) the location of the particular interface method (of B's dux( ) and foo( )) that are associated with the given IMT slot) for a given method invocation statement being processed (method invocation statement for B's dux( ) or (foo)).

In this example, interface method invocation of B's bar( ) involves loading the pointer to B's bar( ) from slot 2 of the IMT (as described in steps 403 and 405 above). On the other hand, method invocation of B's dux( ) involves passing control to the conflict resolution routine pointed to by slot 0 of the IMT for B's dux( ) and executing the conflict resolution routine—which will finally pass control to B's dux( ) (as described in step 309 above).

Advantageously, the interface method invocation mechanism of the present invention replaces the intensive search performed by prior art techniques with efficient processing that, in the case that the corresponding IMT entry is associated with a single interface method, is equivalent to a virtual method call, or, in the case that the corresponding IMT entry is associated with multiple interface methods, involves lightweight and more efficient conflict resolution code.

While the invention has been described in connection with specific embodiments, it will be understood that those with skill in the art may develop variations of the disclosed embodiments without departing from the spirit and scope of the following claims.

I claim:

1. A computer implemented method for invoking interface methods in an object oriented program, said computer implemented method comprising the steps of:

providing a table of entries each corresponding to a set S of interface methods implemented by the program, wherein, for at least one given entry, the set S corresponding to the given entry belongs to one of a first type and a second type, the first type including a single interface virtual method implemented by the program and the second type including a plurality of interface methods implemented by the program, wherein:

in the event that the set S corresponding to the given entry belongs to the first type, the given entry stores a pointer to the implementation of the single virtual method in the set S corresponding to the given entry; and in the event that the set S corresponding to the given entry belongs to the second type, the given entry stores a pointer to the implementation of a conflict resolution routine that operates at execution time to selectively identify one of the plurality of interface methods in the set S corresponding to the given entry, and transfer control from the conflict resolution routine to the implementation of the identified one interface method.

2. The method of claim 1, further comprising the steps of:

for each given interface method in the set S, generating an identifier corresponding to signature of the given interface method and storing the signature in persistent storage for subsequent use.

3. The method of claim 2, further comprising the steps of:

in response to processing a method invocation statement in the program that invokes an interface virtual method in the set S corresponding to the given entry, generating a method invocation routine that:

stores the identifier assigned to the signature of the interface virtual method VM in a predetermined storage location, and uses the pointer stored in the given entry corresponding to interface virtual method to transfer control to one of the implementation of the interface virtual method VM and the implementation of the conflict resolution routine.

4. The method of claim 3, wherein the conflict resolution routine provides, for each given interface method of the plurality of interface methods in the set S corresponding to the given entry, an association between the identifier assigned to the signature of the given interface method and a pointer to the implementation of the given interface method.

5. The method of claim 4, wherein the conflict resolution routine loads the identifier stored in the predetermined storage location, searches to find a match between the loaded identifier and one of the identifiers assigned to the signature of the plurality of interface methods in the set S corresponding to the given entry, and uses the pointer associated with the matching one identifier to transfer control to the implementation of the interface method corresponding to the matching one identifier.

6. The method of claim 5, wherein the predetermined storage location comprises a scratch register in a register file of a computer processing apparatus that is executing the method invocation routine.

7. The method of claim 4, wherein said pointer to the implementation of the given interface method comprises an offset into a virtual method table of the class of the this parameter to the interface method being invoked.

* * * * *